F. O. KUNZ.

Assignor to ILER & Co.

MASH COOLER.

No. 10,509. Reissued Aug. 12, 1884.

Witnesses:

C. S. Belt

O. H. Clark

INVENTOR

Frederick O. Kunz.

By Paine & Sad

Attorneys.

UNITED STATES PATENT OFFICE.

FREDERICK O. KUNZ, OF OMAHA, NEBRASKA, ASSIGNOR TO ILER & CO., OF SAME PLACE.

MASH-COOLER.

SPECIFICATION forming part of Reissued Letters Patent No. 10,509, dated August 12, 1884.

Original No. 261,098, dated July 11, 1882. Application for reissue filed June 19, 1884.

*To all whom it may concern:*

Be it known that I, FREDERICK OTTO KUNZ, a citizen of the United States, residing at Omaha, in the county of Douglas and State of Nebraska, have invented certain new and useful Improvements in Mash-Coolers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to an apparatus for cooling mash to the fermentation temperature, which is simple in construction, effective in operation, and capable of being thoroughly cleaned with facility. The apparatus comprises a vertical column or chamber, which is traversed by a series of water-conducting pipes, and is provided with detachable outer walls and doors for gaining access into the interior of the column and the tubes, for cleaning and other purposes. The water-tubes extend through the shell of the vertical column and lead into small non-communicating chambers formed between the shell of the cooler and the outer walls. The object of these chambers is to cause the water circulating through the tubes in an upward direction to take a circuitous or zigzag course and flow out at the top of the cooler. The mash to be cooled flows into the cooler at the top thereof, and is strained and thrown down over the pipes in the form of a shower, and it makes its exit at the bottom of the cooler and passes through a vertical stand-pipe and escapes at the top of the latter, being then of a temperature suitable for immediate fermentation in the customary fermenters.

Figure 1:
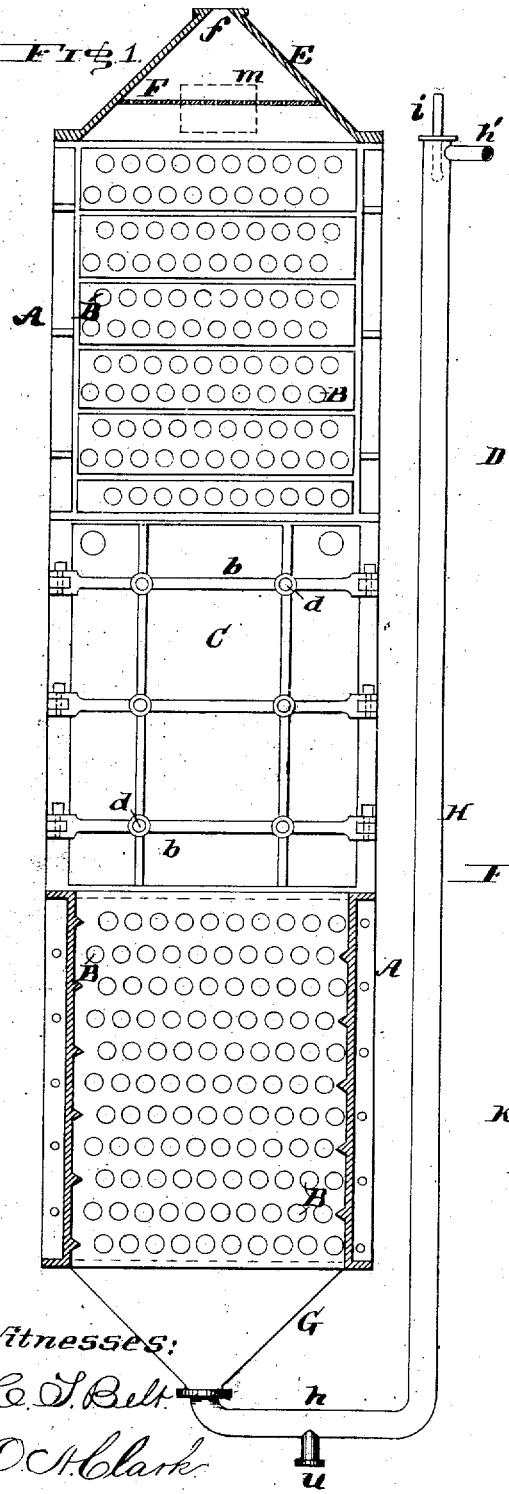
Figure 2:
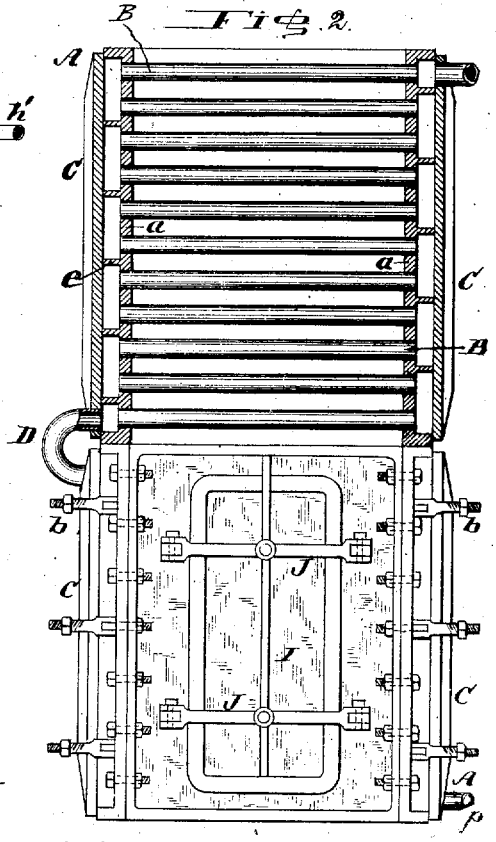
Figure 3:
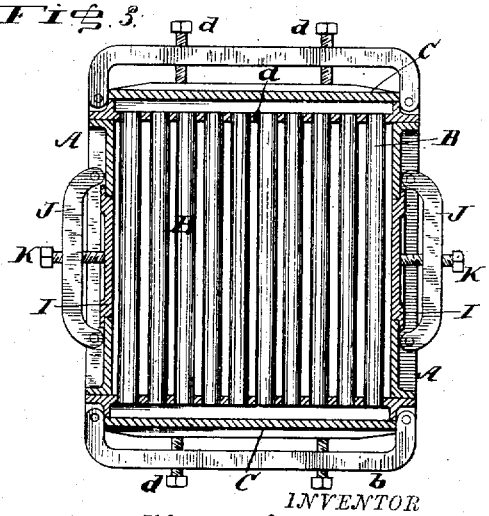

In the accompanying drawings, Figure 1 is a vertical elevation of a mash-cooler constructed according to my invention. Fig. 2 is a vertical section with part of exterior view, and Fig. 3 is a horizontal sectional view.

The shell of the cooler is in the form of a column, A, which is generally constructed of several rectangular sections superposed and connected together in any suitable manner. The interior chamber of this column is continuous from top to bottom, and is traversed by numerous tiers of horizontal tubes, B, which extend through the inner side walls, *a*, of the column, as is shown in Figs. 2 and 3. Detachable walls or plates C, secured outside the inner walls, *a*, by means of yokes *b* and screws *d*, serve to form a space or series of partitioned chambers between the two walls mentioned, and the tubes B lead into these chambers. Partition-plates *e*, arranged in the space between the outer and inner walls, serve to form the chambers referred to. The several sections comprising the column are connected by short V-shaped pipes D, which serve to conduct the cooling medium entering the cooler through the pipe *p* from one section to the adjoining one above. A cap or conical hood, E, surmounting the cooling-column, contains a strainer-plate, F, and has a top opening, *f*, for the introduction of the mash. The object of the strainer is to separate lumps, husks, and other impurities existing in the mash, and the latter flows down over the cooling-pipes and escapes through a cone-shaped bottom head, G, of the column. A stand-pipe, H, extending alongside the cooling-column and terminating at or near the top thereof, is connected with the bottom outlet of the column by a short horizontal branch, *h*. The mash ascends said stand-pipe and escapes at the top thereof through a pipe, *h'*, which leads to the fermenters. A thermometer, *i*, is inserted into the top of the stand-pipe for ascertaining the temperature of the mash. The mash after its passage through the cooling-column and stand-pipe is of the temperature necessary for fermentation. By reason of the difference in specific gravity between cold and warm mash it will be manifest that only mash sufficiently cooled can be taken from the top of the stand-pipe. Access can be gained to the ends of the cooling-tubes, for cleaning the same by brushes and water-jets, by removing the walls or plates C. Doors I in the sides of the sections of the column (shown in Fig. 3) will permit the inside of the cooling-chamber to be washed out. These doors are easily removable, and are secured in position by means of yokes J and clamping-screws K. A hand-hole, *m*, in the top head of the cooler, will enable the strainer to be reached for cleaning it, and an opening,

*u*, in the horizontal branch of the stand-pipe, serves for the discharge of the water used in washing out the cooler.

I am aware that mash or beer coolers have heretofore been constructed so as to cause the cooling medium to flow in an upward direction while the mash or beer pursues a downward course through the apparatus, and hence I disclaim all broadness of invention.

Having thus described my invention, what I claim as new, and desire to secure by Letters Patent, is—

1. In a mash-cooler, the combination of a stand-pipe having a top discharge-opening for the cooled mash, with a cooling-column connected with the bottom of the stand-pipe, as and for the purpose set forth.

2. A mash-cooler comprising a series of superposed shells or sections having transverse water-tubes, detachable outer walls, inner walls provided with partition-strips, and doors leading into the mash-chamber, as and for the purpose set forth.

In testimony whereof I affix my signature in presence of two witnesses.

FREDERICK O. KUNZ.

Witnesses:
HENRY C. AKIN,
EDWARD A. BENJAMIN.